United States Patent [19]

Burger

[11] Patent Number: 4,515,578

[45] Date of Patent: May 7, 1985

[54] ROLLER CHAIN AND ITS USE FOR THE MOVEMENT OF ONE SURFACE IN BEARING RELATION WITH ANOTHER

[76] Inventor: Raymond Burger, 7, place de la Fleur, Sainte-Marie-Aux-Mines (Haut-Rhin), France

[21] Appl. No.: 413,620

[22] Filed: Sep. 1, 1982

[30] Foreign Application Priority Data

Sep. 1, 1981 [FR] France ............... 81 16738

[51] Int. Cl.³ ............................................. F16G 13/02
[52] U.S. Cl. ........................... 474/231; 474/140; 198/779
[58] Field of Search ............... 474/231, 230, 228, 226, 474/198, 199, 140, 144, 146, 147, 209; 308/6 R, 3.8, 203; 384/280, 281; 198/841, 850, 851, 779

[56] References Cited

U.S. PATENT DOCUMENTS

| | | | |
|---|---|---|---|
| 3,237,755 | 3/1966 | Weihe, Jr. | 198/779 |
| 3,701,413 | 10/1972 | Leahy et al. | 198/779 |
| 3,723,230 | 3/1973 | Trouther | 156/580 |
| 3,856,358 | 12/1974 | Krekeler | 299/82 |
| 4,339,030 | 7/1982 | Hirata | 198/779 |

FOREIGN PATENT DOCUMENTS 2163014 7/1973 France .
754935 8/1956 United Kingdom .

Primary Examiner—Stephen J. Novosad
Assistant Examiner—Thuy M. Bui
Attorney, Agent, or Firm—Young & Thompson

[57] ABSTRACT

A roller chain adapted to be placed in compression between two members one of which is movable and the other fixed and to bear high pressure arising between these members, comprises a plurality of rollers on each of a series of transverse axles, the axles being interconnected by links of a height less than the external diameter of the rollers. Sleeves are threaded on the axles and the rollers turn on these sleeves. The roller chain is confined between guide surfaces provided on at least one of the relatively moving members between which it is disposed, this member also having removable members thereon that define these guide surfaces, the guide surfaces contacting the outermost links.

6 Claims, 3 Drawing Figures

ROLLER CHAIN AND ITS USE FOR THE MOVEMENT OF ONE SURFACE IN BEARING RELATION WITH ANOTHER

The roller chain of the present invention deals with the problems faced more and more frequently in industry, by the displacement under high pressure of one surface with respect to another.

Lubrication and the use of anti-friction materials suffice for lower pressures. For higher pressures, ball bearings, needle bearings or roller bearings disposed in cages in the form of plates are used. These devices are limited in their applications to reciprocatory movement of confined surfaces and do not provide for the translation of one surface with respect to another, which has to be provided by a separate mechanism applied to the movable surface.

The roller chain of the invention combines three functions:

1. A function of force transmission of a surface moving relative to another.
2. The function of driving the moving surface relative to the other, the roller chain being actuated by at least a motor-driven sprocket.
3. A guiding function, the roller chain circulating in roller tracks provided with sides.

In fulfilling these three functions, the roller chain has important advantages:

1. Very high pressures can be transmitted, the roller chain structure permitting the use of a large number of rollers per unit of surface area.
2. The builder of machines, thanks to the roller chain, can make the fixed surface (generally a frame) absorb the compressive forces and relieve the movable surfaces (plates, pivoted plates or metal bands) whose function will be limited to a support and rolling function. By the use of several roller chains comprising one or more rows of rollers, no limit is imposed on the surface area.
3. By utilizing a roller chain for the movement of the mobile surface with respect to the fixed surface, all normally required mechanisms are avoided, which by itself is a considerable advantage from the standpoint of construction.
4. The roller chain has all the advantages of classical roller transmission chains, namely, flexibility, strength and long life.
5. The structure of the roller chain permits exact guiding of the rollers. When the structure is under high pressure, it is necessary that the axes of the rollers be exactly perpendicular to the axis of movement of the movable surface with respect to the fixed surface.
6. It is particularly advantageous to have as high a ratio of the diameter of the rollers to their width as possible, to reduce the misalignment forces due to the development of too great a play upon the development of wear giving rise to too great freedom of movement. The present roller chain structure achieves this ratio.
7. By the structure of the roller chain itself, its guidance may be ensured by sides whose surface is such that wear due to friction will be as small as possible.

The use of the roller chain, comprised by the chain proper, sprockets and guide members will be advantageous with respect to durability and cost thanks to standardization of its manufacture and its uses.

The invention will be better understood by the following description, given by way of non-limiting example, and explained with reference to the accompanying schematic drawing, in which.

Figure 1:
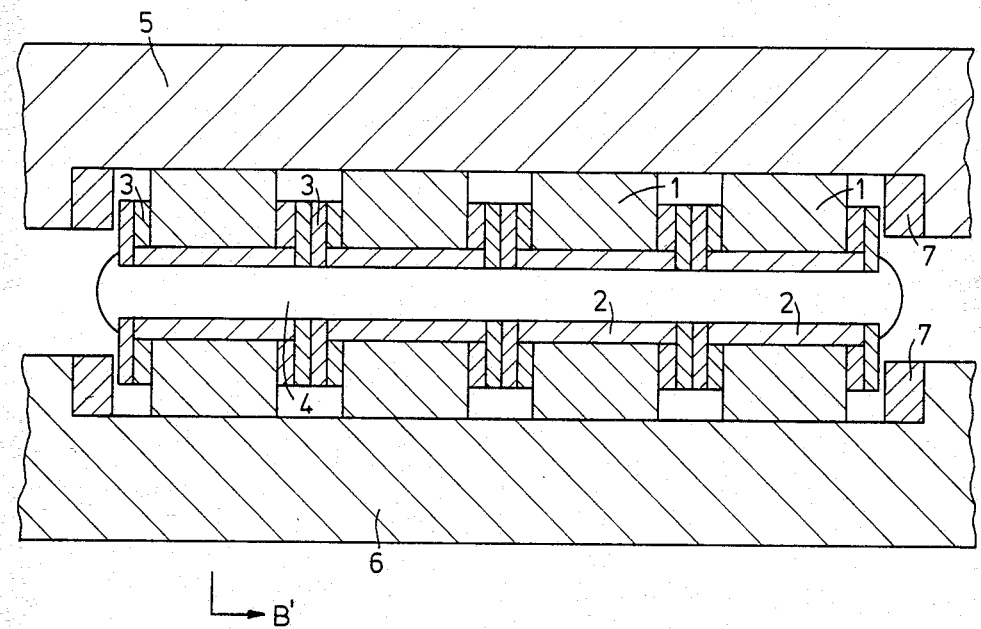
FIG. 1 is a schematic cross-sectional view of a quadruple roller chain interposed between a fixed surface (a frame) and a movable surface (a plate), viewed perpendicular to the chain axles, on the line A—A' of FIG. 2.
Figure 2:
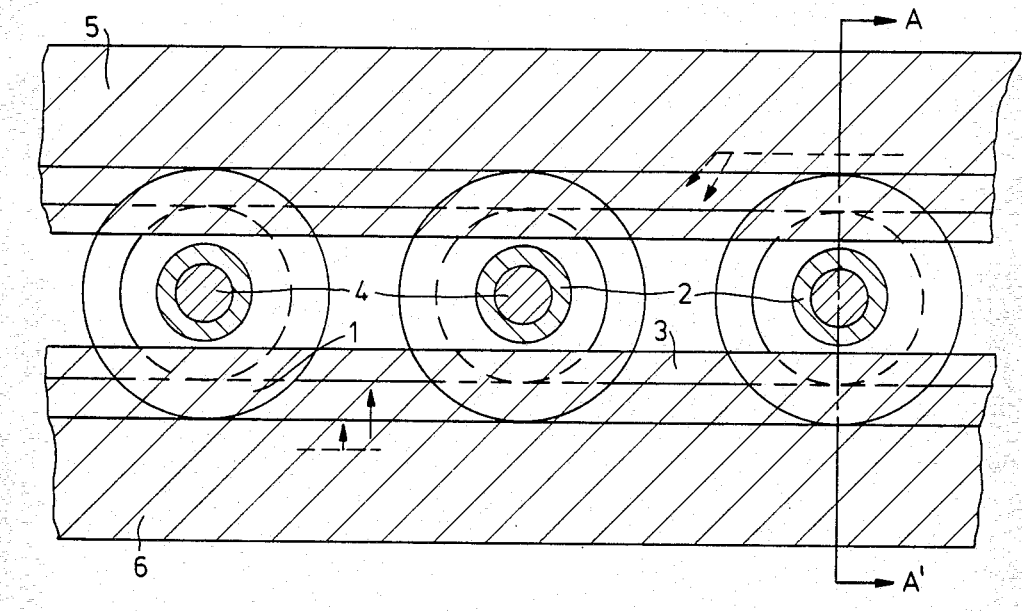
FIG. 2 is a cross-sectional view of the same chain, viewed parallel to the chain axles, on the line B—B' of FIG. 1.
Figure 3:
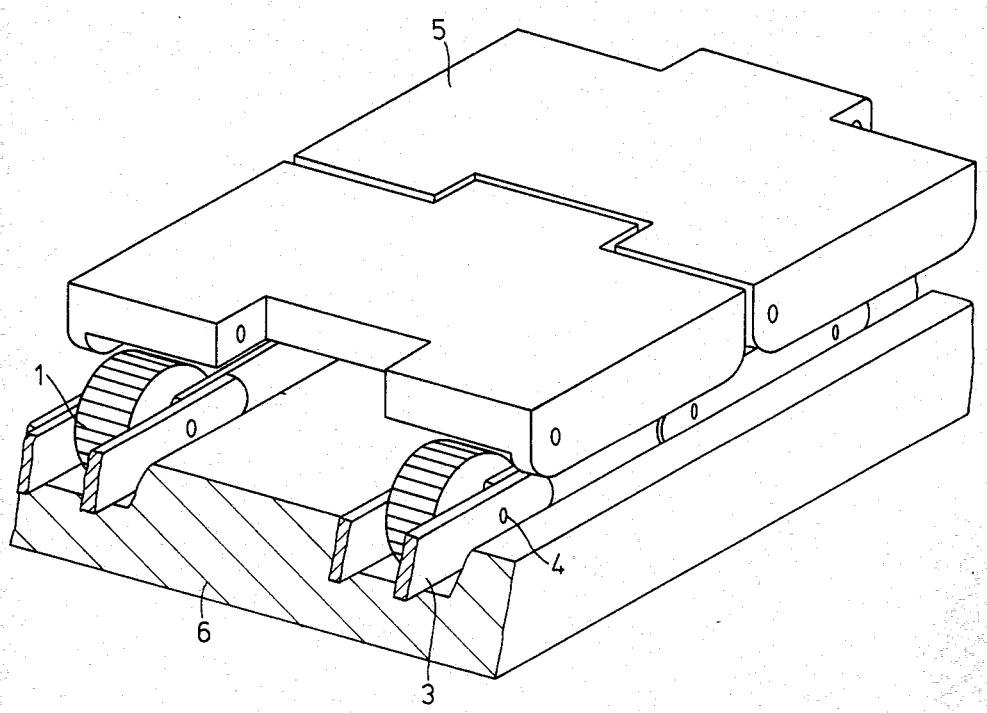
FIG. 3 is a fragmentary top and side perspective view of the assembly of the present invention.

The rollers 1, of hardened steel, are mounted on sleeves 2 assembled with links 3 on axles 4.

The rollers 1 of a greater diameter than the links 3, are interposed between the movable plate 5 and the fixed frame 6.

In the illustrated embodiment, the external links 3 of the chain provide guidance by coming into contact with the removable sides 7. For certain uses, these sides may be mass produced and need not be interchangeable. The same is true for the roller guides on which the rollers circulate. In FIG. 1, the roller guides are mass produced. In general, when marketing the roller chain, standardized profiles can be offered for each type of chain and roller, the nature of the metal being chosen to obtain optimum rolling coefficient and as little wear as possible.

The drawing does not show the drive mechanism for the chain, comprising a motor-driven sprocket, having for example sixteen teeth, with an interval obviously identical to that of the chain. Also not shown is the return sprocket situated downstream in the same plane as the drive sprocket.

The drive force to be exerted on the chain being generally less than one percent of the total compressive force transmitted by the chain, it is generally advantageous to use a number of sprockets less than the number of rows of rollers of the chain.

The linear speed of the roller chain is equal to half the linear speed of the moving surface, which is quite advantageous for reducing wear.

What is claimed is:

1. A roller chain disposed in compression between a movable plate and a fixed frame, comprising rollers (1) mounted on sleeves (2) on axles (4) and spaced apart by links (3), and guide means for the chain provided on at least one of said plate and frame, said plate and frame contacting opposite sides of the peripheries of the same said rollers.

2. A roller chain as claimed in claim 1, in which the height of the links (3) is less than the diameter of the rollers (1).

3. Roller chain according to claim 1, characterized by a plurality of rollers (1) on each axle (4).

4. A roller chain as claimed in claim 1, in which said guide means comprise removable profiles (7) of antifriction material that bear on the side faces of the roller chain.

5. Roller chain as claimed in claim 4, in which said side faces are constituted by links.

6. Roller chain according to claim 5, in which the last-named links have an internal diameter about equal to the external diameter of the axles (4) and are retained between heads on the axles (4) and the adjacent said sleeves (2).

* * * * *